March 7, 1939. A. CHRISTIANSON 2,149,840
DRAFT GEAR COUPLING ARRANGEMENT
Filed April 18, 1938 4 Sheets-Sheet 2
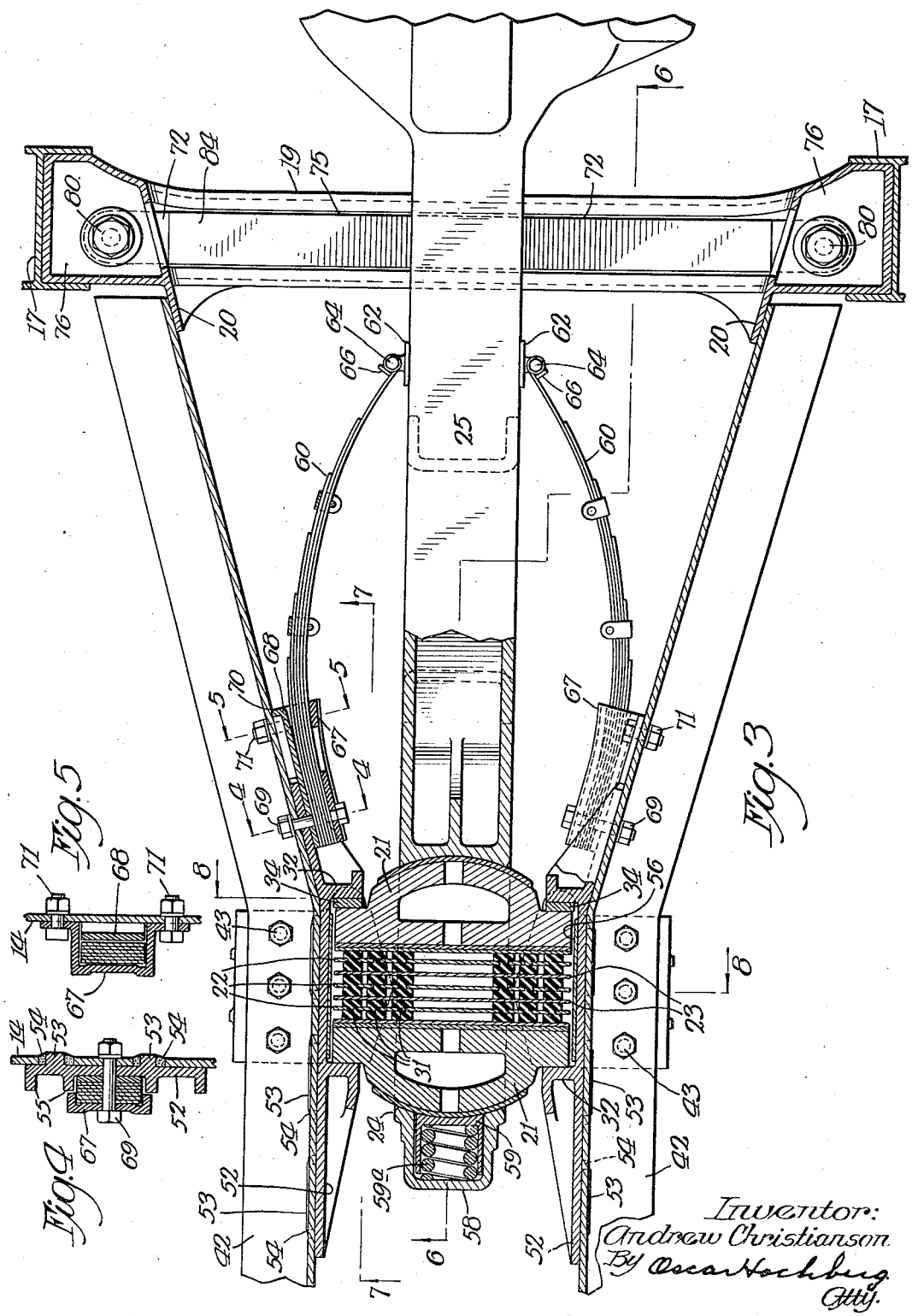

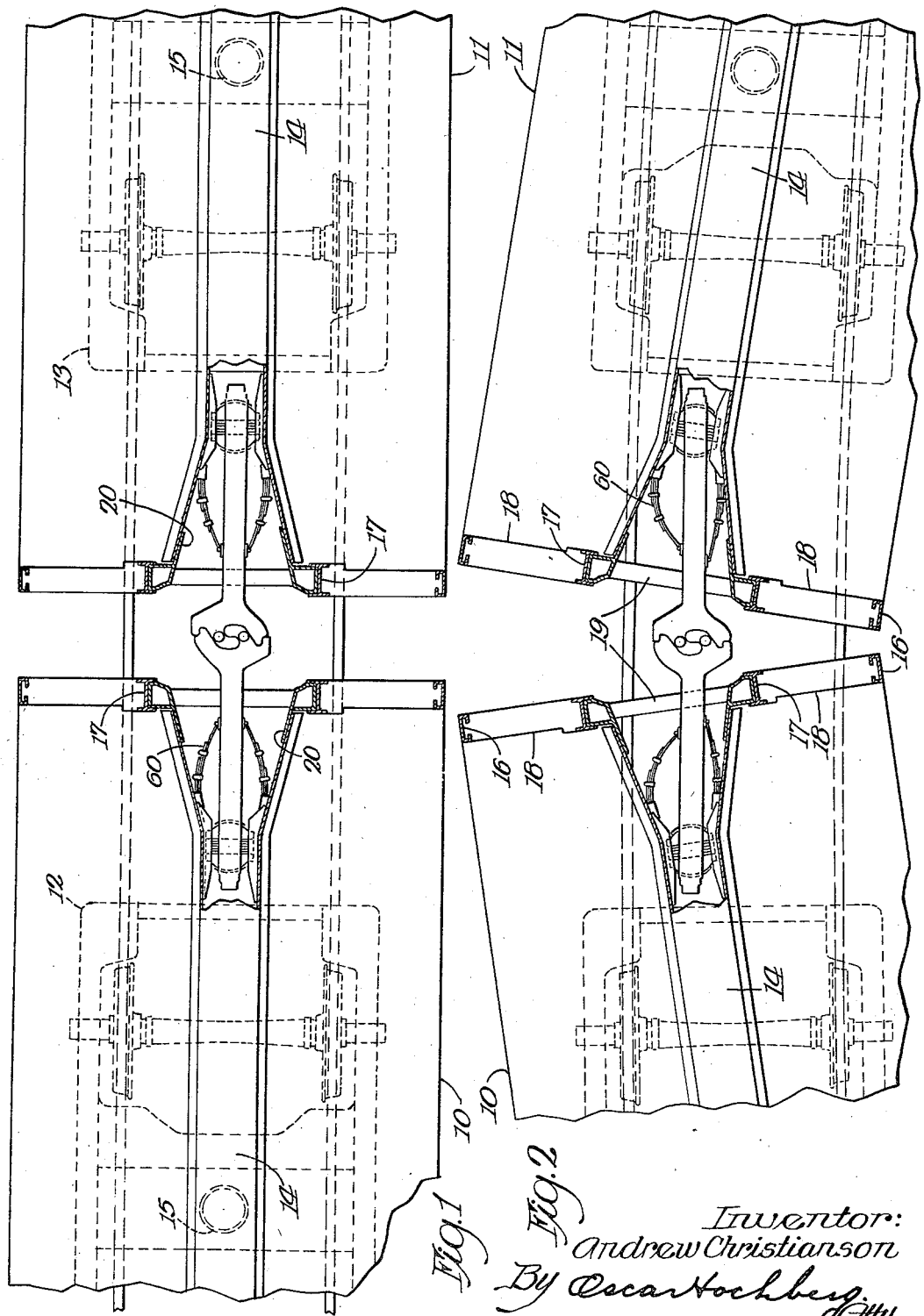

March 7, 1939.　　　A. CHRISTIANSON　　　2,149,840
DRAFT GEAR COUPLING ARRANGEMENT
Filed April 18, 1938　　　4 Sheets-Sheet 3
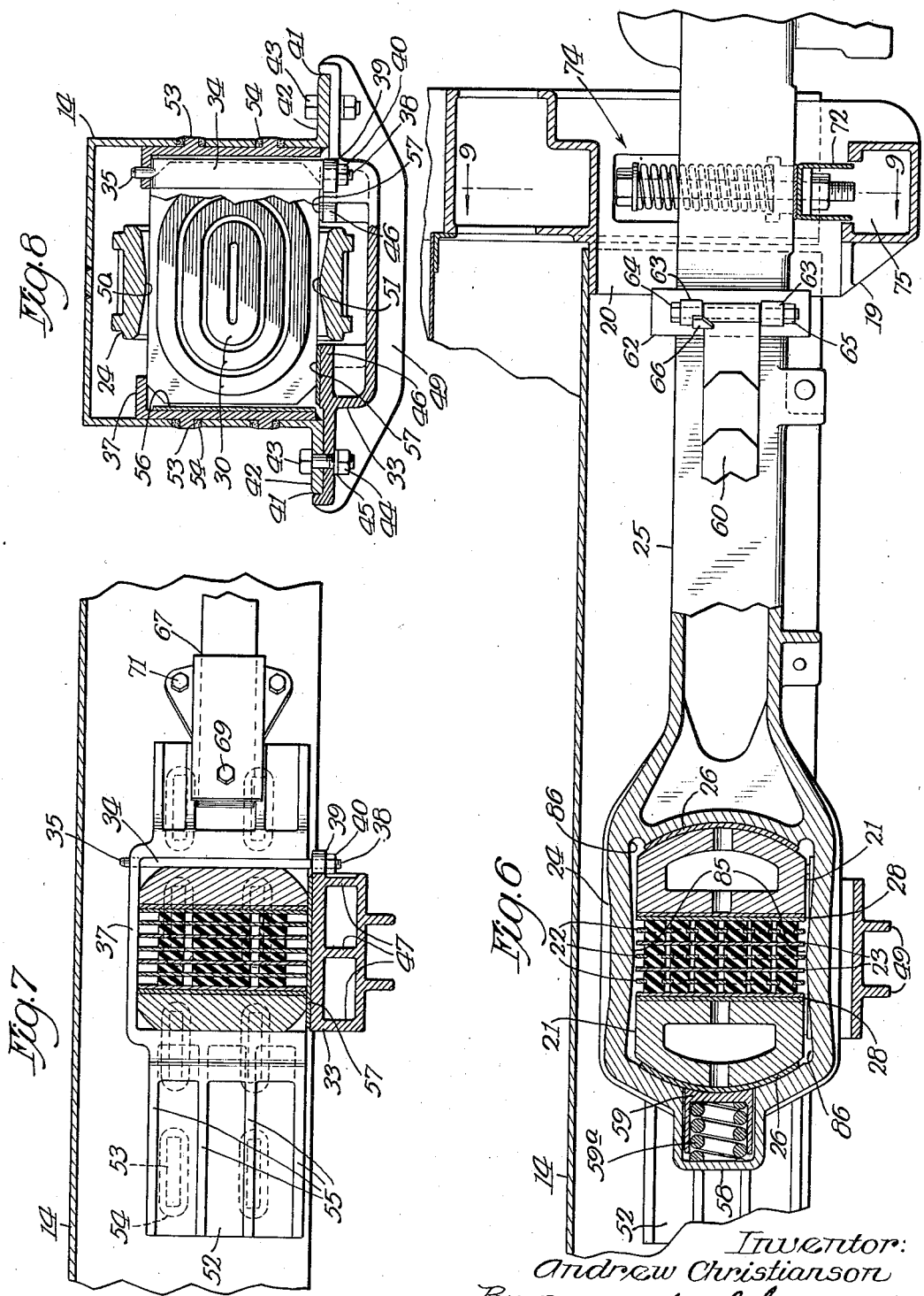
Inventor:
Andrew Christianson
By Oscar Hochberg
Atty.

March 7, 1939.　　　A. CHRISTIANSON　　　2,149,840
DRAFT GEAR COUPLING ARRANGEMENT
Filed April 18, 1938　　　4 Sheets—Sheet 4
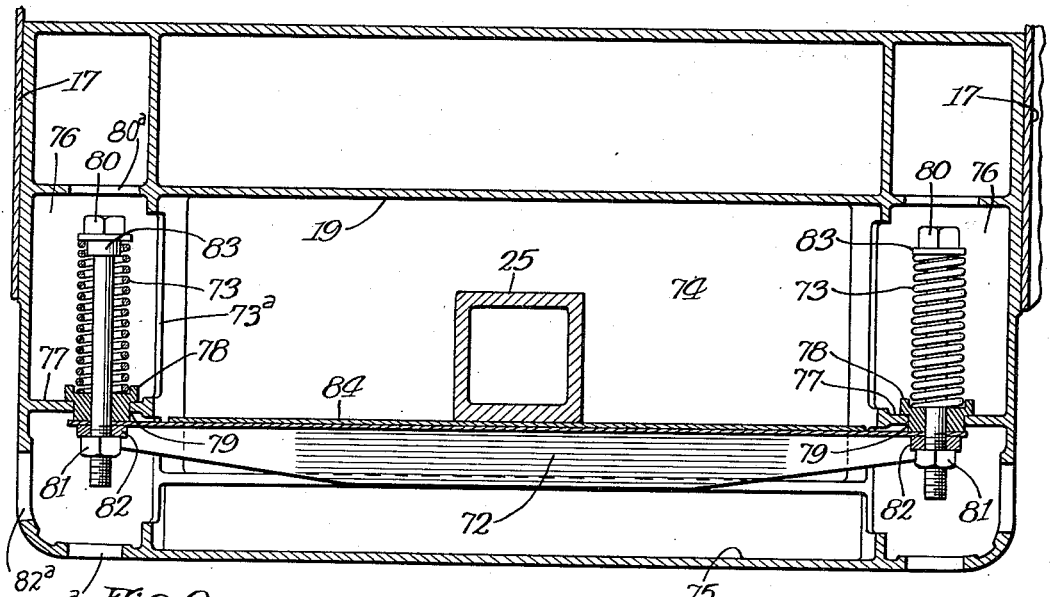
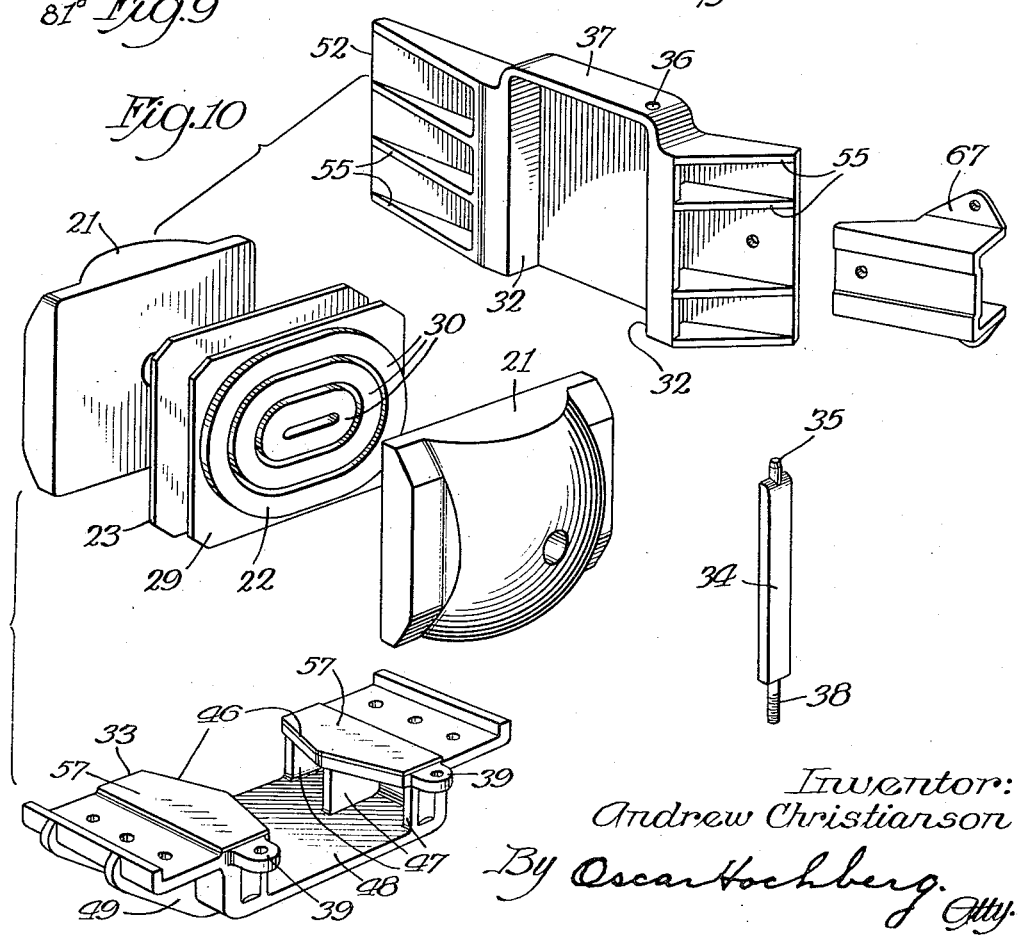
Inventor:
Andrew Christianson
By Oscar Hochberg
Atty.

Patented Mar. 7, 1939

2,149,840

UNITED STATES PATENT OFFICE 2,149,840

DRAFT GEAR COUPLING ARRANGEMENT

Andrew Christianson, Hammond, Ind., assignor to Pullman-Standard Car Manufacturing Company, Chicago, Ill., a corporation of Delaware Application April 18, 1938, Serial No. 202,594

31 Claims. (Cl. 213—20)

This invention relates to draft gears for railway vehicles and more particularly to such gears for use in conjunction with tight-lock couplers.

The principal object of the invention is the simplification of draft gears of this type, together with associated parts, for economy of manufacture and ease of application. In the attainment of these, other objects are realized which provide excellence of design and afford such features as an integral draft gear yoke and coupler and which is universally movable, in its entirety, about the draft gear as a pivot; a single unitary draft and buffing gear of compact arrangement and spherical outside contour and assembled with the coupler and yoke under initial compression and applied therewith as a unit; a bottom draft gear support which in addition to that function and reinforcement of the center sill also acts to keep the yoke centered with respect to the draft gear; a draft gear in which lost motion between the followers and yoke is prevented; a cheek plate arrangement permitting easy application of the draft gear but adapted to prevent lost motion between the follower plates and draft stops; and a draft gear arrangement the supporting and confining parts of which serve to reinforce the vehicle understructure at points of stress.

An important object of the invention is the provision of a draft gear for tight-lock couplers utilizing an integral yoke and coupler shank having means for centering the yoke with respect to the draft gear and means resiliently engaging the coupler shank for centering the coupler and other means resiliently engaging the coupler shank to maintain it normally horizontal.

The foregoing and other objects are obtained by the construction hereinafter described and illustrated in the accompanying drawings, in which—

Fig. 1 is an outline plan view of a pair of adjoining vehicles coupled together by the tight-lock coupler and draft gear arrangement of the present invention;

Fig. 2 is a similar view showing the vehicles on a curve and illustrating the relation of the parts under such conditions;

Fig. 3 is an enlarged plan view, partly in section, of the draft gear, coupler and associated parts for centering and support thereof;

Figs. 4 and 5 are detail, sectional views through the anchoring devices for the coupler centering means taken on the lines 4—4 and 5—5, respectively, of Fig. 3;

Fig. 6 is a longitudinal, vertical, sectional view through the draft gear and coupler supporting mechanism taken on the line 6—6 of Fig. 3;

Fig. 7 is a longitudinal, sectional view through the draft gear taken on line 7—7 of Fig. 3 looking at a cheek plate and anchoring device for the coupler centering means and showing the disposition of the gear within the draft stops;

Fig. 8 is a transverse, staggered, sectional view taken on the line 8—8 of Fig. 3 through the draft gear and confining structure showing the relative disposition of the parts;

Fig. 9 is a transverse, sectional view through the coupler supporting mechanism taken on the line 9—9 of Fig. 6; and Fig. 10 is a perspective view of the various parts of the draft gear in their disassembled relative positions.

In the drawings, 10 and 11 represent vehicles pivotally supported upon trucks 12 and 13. Each vehicle is provided with an understructure including a center sill 14 comprising a pair of Z-bar members having their inwardly extending upper flanges integrally welded along their median line to provide a unitary, inverted, flanged, U-shaped structure. This center sill structure is flared at opposite ends to accommodate the draft gear and coupler centering mechanism and provide for the horizontal movement of the coupler, as best shown in Figs. 1 and 2 of the drawings. The vehicles 10 and 11 are pivotally supported upon the respective trucks 12 and 13 by means of center plates 15 secured to the center sills 14. The end walls of the vehicles are provided with corner posts 16 and end posts 17 connected by end sills 18. The coupler carrier casting 19 completes the end sill structure between the end posts 17 with which it is interlocked, as best shown in Fig. 3, and secured by welding.

The draft gear of this invention is primarily designed for use with tight-lock couplers in which no slack occurs between adjoining vehicles. The draft gear yoke, as best shown in Fig. 6, forms an integral part of the coupler shank and thus requires that the center sill be flared at the ends to permit lateral displacement of the coupler shank, since relative pivotal movement between connected couplers is prevented. The draft gears, at opposite ends of a vehicle, are mounted directly at the diverging points of the center sill Z-bar members whereby draft and buffing forces are transmitted through a straight column from draft gear to draft gear. By the disposition of the gear at these points, the center sill also is afforded the benefit of the reinforcement offered by the draft stop structure and the bottom support. From the point where the draft gear is applied, the Z-bar sills flare outwardly at each end of a vehicle and are attached to the coupler castings 19 by means of flanges 20 provided for that purpose and to which they are welded.

The draft and buffing gear comprises a pair of hollow cored follower plates 21, a plurality of rubber spring units 22 and metallic separator plates 23—all confined within the yoke 24 of the coupler 25 and thus assembled before application to the vehicle. The yoke-engaging surfaces of the followers are spherical to provide for universal pivotal action of the yoke and coupler about the draft gear in response to movements of associated vehicles in a train and resulting from conditions of the track and roadbed. The spherical surfaces of the followers 21 are protected by separate, hardened steel wear plates 26 to the exact spherical contour of the followers and secured thereto by welding, and against which the front and rear complemental, spherical engaging surfaces of the yoke 24 are adapted to bear. The complete draft gear is assembled in the yoke prior to application to the vehicle and is then applied with the coupler as a unit. The gear is maintained in assembled relation during such application by the expansive force exerted by the spring units 22 which are initially compressed to the desired degree by the insertion of shim plates 28. The spring units 22, as best shown in Fig. 10, comprise flat metal plates 29 having rubber cushioning members vulcanized to the opposite sides thereof in the form of annular rings 30 which are integral from one side of the plate to the other through the medium of holes 31. Rubber spring units of this kind have been found to provide the desired cushioning qualities and to permit necessary flow of the rubber during compression, and, while these units particularly lend themselves to this invention, other cushioning means may be substituted therefor if desired.

The draft gear is applied by inserting the rear end of the coupler, comprising the yoke 24 in which the gear is confined, through the coupler support casting 19 and raising the draft gear up between the draft stops 32 disposed upon the center sill webs where it is supported by a bottom plate 33 secured by bolts 43 to the horizontal bottom flanges of the center sill. It will be seen that since the coupler is inserted thru the casting 19, the draft gear necessarily will be raised between the draft stops at an angle and therefore requires more space between the stops than is actually necessary to accommodate the draft gear. To afford this space, permitting ready insertion of the draft gear, removable filler members 34 are provided between the front follower and draft stops whereby the draft gear may freely be inserted between the stops 32 and the members 34 thereafter applied to eliminate any play whatever and insure immediate response of the draft gear to loads imposed. The fillers 34 comprise members of a width substantially the same as the draft stops and of a thickness fully to take up the space existing between the followers 21 and the draft stops 32 after the assembled draft gear is finally in place between the stops. In actual practice, the gear is slightly compressed by the application of the filler members. The members 34 are held in place each by means of a stud 35 entering a hole 36 in the integral top flange 37 connecting the front and rear stops 32 and secured by a depending threaded shank 38 passing through a special extension 39, provided for the purpose, on the draft gear bottom support 33 and having a nut 40 threaded thereon engaging the bottom surface of the extension 39 positively to lock the removable member in place.

The draft stops 32 and draft gear bottom support 33 are so disposed that the draft gear is supported in such manner that the center line of the draft gear and coupler approximates the neutral axis of the center sill, whereby draft and buffing forces are applied in a manner to minimize eccentric loading of the sill and are transmitted through the coupling from the neutral axis of the center sill on one vehicle directly to the neutral axis of the center sill of an adjoining vehicle.

The draft gear bottom support 33 comprises a casting interlocked at 41 with the opposite center sill bottom flanges 42 and secured to each by a plurality of bolts 43 utilizing nuts 44 and lockwashers 45 to hold the complete assembly in place and which permit ready removal of the entire mechanism. The draft gear proper, including the followers 21, spring units 22 and separator plates 23, is directly supported at opposite sides of the yoke 24 upon flat shelves 46 cast integral with the bottom support 33, as best shown in Fig. 8. The shelves 46 are each reinforced by a plurality of vertical webs 47 connecting the shelves with the plate 48, downwardly spaced with respect to the shelves to accommodate the yoke, and the entire casting strengthened by cross webs 49 on the bottom side. The rear end of the coupler comprising the yoke 24 is, of course, supported upon this same casting through the medium of the draft gear.

The shelves 46, in addition to supporting the draft gear and yoke, serve the further function of keeping the yoke centered with respect to the draft gear, as will best be seen from an examination of Figs. 3, 8 and 10. The shelves closely engage the yoke at opposite sides to prevent lateral shifting thereof and are shaped to permit necessary pivoting of the coupler and yoke. The shelves are in closest proximity to opposite sides of the yoke at their respective centers and thence flare horizontally outward in opposite directions, providing a restricted passage for centering the yoke and yet permitting oscillation of the yoke in absorbing draft and buffing shocks, and by reason of the flare of the opposing shelves front and rear of the draft gear and in combination with the spherical shape of the follower plates 21, lateral pivoting is readily permitted.

Provision is also made for slight axial rotation of the coupler and yoke with respect to the draft gear. As best shown in Fig. 8, the draft gear engaging portions of the upper and lower sections of the yoke are made substantially convex on their inner surfaces in transverse section as at 50 and 51, respectively, whereby the coupler and yoke is free to rotate slightly with respect to the draft gear to compensate for relative movements between associated vehicles in a train. Provision is also made for pivoting of the yoke with respect to the draft gear in response to vertical movement of the coupler. As best illustrated in Fig. 6, it will be seen that the yoke 24 is shaped to permit rocking vertically inasmuch as the upper and lower sections of the yoke provide a progressively increasing amount of clearance from the center 85 thereof above and below the draft gear spring units 22 towards the opposite ends 86 above and below the followers 21. By the provision of these various clearance conditions, the yoke 24 is adapted to universal movement about the draft gear and, in combination with the spherical shape of the draft gear, permits angling movements of the coupler in any direction whatever.

It will be seen that with the bottom support plate located as it is at the point where the center sills diverge and interlock therewith, any tendency of the sills to buckle or spread due to excessive stresses will be resisted by the support plate. The cheek plates 52 are integrally secured to the sills by welding and serve, further, greatly to rigidify the sills at this point, whereby a portion of the center sill, which otherwise might have been weakened, is strengthened substantially by application of the draft gear structure. The cheek plates are shaped to the inside surface of the center sills and secured to the sills by means of cast integral lugs 53 which penetrate the sills and are welded from the outside thereof, as at 54, whereby, in effect and for all practical purposes, they are rendered integral parts of the sill structure.

The draft stops 32 are cast integral with the cheek plates 52 and are each reinforced by integral webs 55. The integral top flanges 37, connecting the draft stops, serve to confine the draft gear and prevent movement upwardly and incidentally, of course, rigidify the cheek plates. The draft gear pocket formed in the respective cheek plates between the draft stops is lined with separate sheets 56 of hardened steel welded thereto to prevent abrasion of the castings by the spring units and separator plates. The shelves 46 of the supporting plate 33 likewise are provided with separate wear plates 57 welded thereto for this same purpose. Confined as it is on all sides, the draft gear is prevented from other than strictly longitudinal movement and is subjected only to the cushioning action required to soften the coupler operation.

It will be noted that the central pair of reinforcing webs 55 on the forward portion of each of the cheek plates is spaced apart an amount greater than those to the rear of the draft gear and this to accommodate the anchoring device for the respective coupler centering springs 60. The springs 60 comprise quarter elliptic leaf springs, bound by spring bands 61, anchored at their rear end to the flared center sills and having pivotal shoes 62 at their extremities slidingly engaging the coupler shank 25. The shoes 62 are of greater height than the coupler shank to permit vertical displacement of the coupler without disengagement with the shoes and are secured to the respective centering springs each by means of spaced trunnions 63 between which the tubular spring end is entered, as best illustrated in Fig. 6, and bolt 64 passed through the assembly and fastened by a nut 65. Excessive rotation of the shoe 62 is prevented by means of stop 66 welded to the uppermost trunnion in position to engage the leaf spring on the outer side in the normal, centered position of the coupler. The respective centering springs are anchored each by means of a pair of complemental members 67 and 68 adapted rigidly to secure the springs to the center sills by means of bolts 69 and 71 and yet readily permitting their removal. Figs. 3, 4, 5 and 7 best illustrate the application of the anchoring devices. The member 68 comprises a plate which acts as a backing member overlapping the cheek plate 52 and fitting between the widely spaced centrally disposed web members 55 and having a flanged end 70 abutting the center sill web to provide a backing surface affording a level bearing against which the spring 60 may be clamped by the member 67 which also holds the member 68 in place. The clamping member 67 straddles the spring 60 and the member 68, and the complete assembly is maintained by the bolt 69 passing through the member 67, the spring 60, member 68, the cheek plate 52, and the sill web, and secured by a nut and lockwasher. The shorter bolts 71, passing through flanges on the members 67 at opposite sides of the spring 60 and member 68, afford additional clamping pressure and serve to position the centering spring properly with respect to the coupler shank and also are secured by nuts and lockwashers taking the sill web, whereby the whole centering arrangement is easily removable or replaceable.

The coupler is supported by the resilient mechanism best illustrated in Figs. 3, 6 and 9. The mechanism comprises an inverted channel member 72 resiliently supported in the coupler carrier casting 19 by means of coil springs 73. The coupler carrier 19 is a substantially rectangular, hollow casting providing an opening 74 for movement of the coupler and having the channel-shaped coupler supporting bar 72 disposed in the hollow, horizontal lower rail 75 and the spring mechanism 73 in the hollow, vertical side leg portions 76. The springs 73 operate in compression and are supported on integral webs 77. The springs rest directly upon collar members 78 fitted within openings 79 in the webs 77 and supported thereby. The channel member 72 is supported by means of bolts 80 extending through the springs 73 and collars 78 and penetrating the web of the channel to have nuts 81 threaded thereon supporting washers 82 upon which the web of the channel 72 rests. Spacing collars 83 maintain alignment of the springs and respective bolts at the top. Cored openings 80$^a$, 73$^a$, 82$^a$ and 81$^a$ facilitate the insertion and fastening of the spring mechanism 73 in the casting 19. The coupler-supporting member 72 is provided on its upper surface with a hardened steel separate wear piece 84 to prevent undue wear as a result of the lateral motion of the coupler and since the supporting mechanism is always in contact with the coupler shank. By the use of this arrangement the coupler is supported in a position vertically for coupling, while, at the same time, vertical movement of connected couplers is provided by the springs 73 for passing elevations and depressions in the track. By the use of this coupler-supporting mechanism in combination with the centering arrangement, the coupler is maintained, at all times, in proper position both vertically and horizontally for coupling on a straight track, and all movements of the coupler are resiliently resisted. The coupler 25 is disposed at a standard height from the rail for ready coupling with adjoining couplers, and, while it is provided with a head of the tight-lock type, it is adapted for coupling with a coupler head of the usual type and the transmission of draft and buffing forces therethrough.

In the operation of the arrangement, as shown in Figs. 1 and 2, the connected couplers on adjoining vehicles extend from the draft gear on one vehicle to the gear on the other and function as a unit therebetween without slack or relative movement and act as a rigid column floating on the draft gears at opposite ends and cushioned thereby in a manner to prevent any lost motion or loose action of the parts whatever during normal operation. Referring now to Figs. 3 and 6, the yoke 24 is provided at the rear side with a spring pocket 58 housing a spring-pressed shoe 59 which engages the spherical surface of the rear follower 21 under the influence of coil spring 59ᵃ. By this arrangement, contact between the relatively movable parts is maintained during normal functioning of the mechanism, and slackness, with its resultant noise, is prevented. The initial compression of the spring 59ᵃ approximates the initial compression of the draft gear in pounds pressure and serves, primarily, to take up any slack between the yoke 24 and followers 21 created by the application of the filler members 34 which, as before stated, slightly compress the draft gear springs 22, when applied, and therefore transfer the stress of the expansive force thereof, resulting from the initial compression, from the yoke 24 to the draft stops 32, and any clearance existing between the spherical surface of either of the followers 21 and the yoke is compensated for by the spring 59ᵃ. By the use of this spring, every movement of the yoke and coupler is cushioned and the parts prevented from slapping together or rattling and all unnecessary noise avoided. The spring 59ᵃ prevents any lost motion whatsoever and constantly exerts a thrust between the draft gear and yoke whereby coupled drawbars float more or less in tension between the draft gears of adjoining vehicles. It is to be noted that the number of spring units 22 in the draft gear has been reduced to a minimum —in actual practice, only three units—which has been found sufficient for the purpose and affords ample cushioning capacity but avoids the excessive and unnecessary travel which occurs in draft gears utilizing springs permitting a greater amount of movement and reduces the relative movement between coupled gears and associated vehicles to an absolute minimum. By the use of such small number of spring units and in combination with tight-lock couplers, unnecessary or lost motion, for all practical purposes, is eliminated. The primary purpose of reducing the number of draft gear spring units, of course, is to reduce the amount of travel which results from the use of a smaller number of spring units, but a twofold result is obtained in the increased economy of manufacture, installation and maintenance since the cost of making, installing and maintaining a small group of spring units is proportionately less than that of a larger group.

From the foregoing, it will be seen that there has been provided a draft gear having an overall spherical contour about which the integral coupler and yoke is adapted to move universally with the sphere of the draft gear as a pivot and in which all movements of the coupler and yoke are cushioned and connected drawbars maintained under tension to provide immediate response to cushioning requirements and prevent noise. The coupler is supported by resilient means compensating for relative vertical movement between adjoining vehicles due to variations in the track or roadbed and is normally maintained in central position by resilient means permitting necessary lateral displacement. The whole arrangement provides an assembly efficient in its simplicity and which, for that reason, is very economical to manufacture and very readily installed or removed with a minimum of labor—having few parts and assembled as a unitary structure. While the coupler has been described as having an integral yoke, it is intended by this description to include yokes not integral but rigid with the coupler and secured in any desired manner.

What is claimed is:

1. A draft gear comprising a plurality of spring units and follower plates having a generally spherical overall contour, and a yoke about said draft gear having universal movement with respect thereto.

2. A draft gear comprising a plurality of spring units and follower plates having an overall generally spherical contour, a yoke complemental to said draft gear, and means other than the draft gear maintaining contact between said yoke and draft gear.

3. A draft gear, a coupler having an integral yoke encircling and supported from said draft gear, said coupler and yoke having pivotal movement universally with respect to said draft gear, and means resiliently supporting said coupler.

4. A draft gear assembly comprising a cushioning unit between front and rear follower plates, said front follower plate having a spherical front surface and said rear follower plate being spherical on its rear surface whereby said draft gear is given an overall generally spheroidal form, and a coupler having an integral yoke complemental to and encircling said draft gear and having pivotal movement universally with respect thereto.

5. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling the draft gear and supported therefrom and having pivotal movement universally with respect thereto, and means supporting said coupler.

6. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling the draft gear and having pivotal movement universally thereabout, and means resiliently supporting said coupler.

7. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling the draft gear and having pivotal movement universally thereabout, means in said yoke for vertical pivoting of the yoke and coupler, and means resiliently supporting said coupler.

8. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling the draft gear and having pivotal movement universally thereabout, means in said yoke for vertical pivoting of the yoke and coupler, and means provided in said yoke providing lateral rotative action of the yoke and coupler with respect to the draft gear.

9. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling said draft gear and having pivotal movement universally with respect thereto, and resilient means between said yoke and draft gear maintaining contact therebetween during movement of said yoke and coupler.

10. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling said draft gear and having pivotal movement universally with respect thereto, a spring pocket in said yoke, a spring in said pocket, and a spring-pressed shoe in frictional engagement with the draft gear and maintaining contact therewith during movement of the coupler and yoke relative thereto under influence of said spring.

11. A draft gear assembly comprising a cushioning unit between front and rear follower plates, said front follower plate having a spherical front surface and said rear follower plate being spherical on its rear surface whereby said draft gear is given an overall generally spheroidal form, a coupler having an integral yoke complemental to and encircling said draft gear and having pivotal movement universally with respect thereto, a spring pocket in the rear of said yoke, a spring-pressed shoe in said pocket complemental to and frictionally engaging the spherical surface of said rear follower plate, and a spring in said pocket maintaining said shoe in contact with said rear follower plate during movement of said yoke realtive to the follower plate.

12. A draft gear assembly including front and rear follower plates, a yoke encircling the follower plates and draft gear, a spring pocket in the yoke, a spring-pressed shoe in said pocket engaging one of said follower plates, and a spring in said pocket maintaining said shoe in contact with said follower plate during movement of the yoke relative thereto.

13. A draft gear assembly comprising a cushioning unit between front and rear follower plates, said front follower plate having a spherical front surface and said rear follower plate being spherical on its rear surface whereby the draft gear is given an overall generally spheroidal form, a coupler having an integral yoke complemental to and encircling said draft gear and having pivotal movement universally with respect thereto, means incorporated in said yoke for vertical pivoting of said yoke and coupler, means in the yoke providing lateral rotative action of the yoke and coupler with respect to the draft gear, a spring pocket in the yoke, a spring-pressed shoe in said pocket complemental to and frictionally engaging one of the follower plates, a spring in said pocket maintaining said shoe in contact with the follower plate during movement of the yoke relative to the follower plate, means resiliently supporting said coupler, and means resiliently centering said coupler.

14. A draft gear, an integral coupler, shank and yoke associated with said draft gear, said yoke encircling and finding support on said draft gear, said coupler and yoke having pivotal movement universally with respect to the draft gear, resilient means engaging said shank to support the coupler, and means engaging said shank resiliently to urge said coupler to a central position.

15. In a vehicle having a center sill structure with webs spaced apart, draft stops on the webs, a draft gear comprising follower plates and an interposed cushioning unit disposed between said stops, a bottom plate supporting said draft gear, a coupler having an integral yoke encircling said draft gear and movable universally with respect thereto, means on said bottom plate for centering said yoke with respect to the draft gear, and means resiliently urging said coupler to a central position comprising leaf springs anchored to the sill webs and bearing against opposite sides of the coupler.

16. In a vehicle having a center sill structure with webs spaced apart, draft stops on the webs, a draft gear comprising follower plates and an interposed cushioning unit disposed between said stops, a bottom plate supporting said draft gear, a coupler having an integral yoke encircling said draft gear and movable universally with respect thereto, and means on said bottom plate for centering said yoke with respect to the draft gear.

17. In a vehicle having a center sill structure with webs spaced apart, draft stops on the respective webs, a draft gear comprising follower plates and an interposed cushioning unit disposed between said stops, a coupler having an integral yoke encircling said draft gear, and leaf springs anchored to the respective sill webs and draft stops and bearing against opposite sides of the coupler resiliently to urge said coupler to a central position.

18. In a vehicle having a center sill structure with webs spaced apart, draft stops on the respective webs, a draft gear comprising follower plates and an interposed cushioning unit disposed between said stops, a coupler having an integral yoke encircling said draft gear, and removable filler members between the draft stops and followers.

19. In a vehicle having a center sill structure with webs spaced apart, said center sill webs being flared laterally at their opposite ends, draft stops on the respective webs disposed at the diverging point of said flare, a draft gear comprising follower plates and an interposed cushioning unit disposed between said stops, a bottom plate supporting the draft gear and connecting the center sill webs at said diverging point, a coupler having an integral yoke encircling said draft gear, leaf springs mounted within the flared portions of said sill webs and anchored thereto and engaging opposite sides of the coupler resiliently to urge said coupler to a central position, and a coupler carrier connecting the flared ends of said sill webs.

20. In a vehicle having a center sill structure with webs spaced apart, said center sill webs being flared laterally at their opposite ends, draft stops on the respective webs disposed at the diverging point of said flare, a draft gear comprising follower plates and an interposed cushioning unit disposed between said stops, a bottom plate supporting the draft gear and connecting the center sill webs at said diverging point, a coupler having an integral yoke encircling said draft gear, leaf springs mounted within the flared portions of said sill webs and anchored thereto and engaging opposite sides of the coupler resiliently to urge said coupler to a central position, and a coupler carrier connecting the flared ends of said sill webs and interlocked with structural members of the vehicle end framing.

21. A draft gear comprising a cushioning unit having an overall generally spheroidal form, and a yoke about the draft gear having universal movement with respect thereto.

22. A draft gear comprising a cushioning unit having an overall generally spheroidal form, a yoke complemental to the cushioning unit, and spring means between the yoke and cushioning unit.

23. A draft gear, a coupler having a rigid yoke encircling and supported from the draft gear and having universal movement with respect thereto, and means supporting the coupler.

24. A draft gear assembly comprising a cushioning unit between front and rear followers, said front follower having a spherical surface and said rear follower having a spherical surface whereby said draft gear is given an overall generally spheroidal form, hardened metal wear plates complemental to the respective spherical surfaces and secured to the respective followers, and a coupler having a rigid yoke complemental to and engaging said hardened metal plates.

25. A draft gear assembly comprising a cushioning unit between front and rear followers, said front follower having a substantially spherical surface and said rear follower having a substantially spherical surface whereby the draft gear is given an overall generally spheroidal form, a coupler having a rigid yoke complemental to the draft gear and having movement universally thereabout, and means supporting the coupler.

26. A draft gear assembly comprising a cushioning unit between front and rear followers, said front follower having a substantially spherical surface and said rear follower having a substantially spherical surface whereby the draft gear is given an overall generally spheroidal form, a coupler having a rigid yoke complemental to said draft gear and movable universally thereabout, and spring means between the yoke and draft gear.

27. A draft gear assembly comprising a cushioning unit between front and rear followers, said front follower having a substantially spherical surface and said rear follower having a substantially spherical surface whereby the draft gear is given an overall generally spheroidal form, a coupler having a rigid yoke complemental to said draft gear and movable universally thereabout, and spring means between the yoke and spherical surface of one of said followers.

28. A draft gear assembly comprising a cushioning unit including a follower plate having a spherical surface, a hardened metal wear plate complemental to said spherical surface and secured to the follower plate, and a yoke complemental to and engaging said hardened metal wear plate.

29. A draft gear assembly comprising a cushioning unit including a follower plate having a spherical face, said spherical face having a hardened wear surface, and a yoke complemental to and engaging said hardened wear surface.

30. A follower plate having a flat surface for engaging a draft gear cushioning means and having its opposite surface spheroidal in contour, said spheroidal contour having a hardened surface for complemental engagement with a draft yoke.

31. A draft yoke including front and rear walls having spaced connecting walls, said front and rear walls each having a concave-spheroidal surface disposed in opposing relation one to the other, and one of said front and rear walls having a backwardly projecting pocket adapted to contain a spring-pressed shoe for engagement with the follower plate of a draft gear.

ANDREW CHRISTIANSON.